(12) United States Patent
Xu et al.

(10) Patent No.: US 12,507,932 B2
(45) Date of Patent: Dec. 30, 2025

(54) ELECTRODE FOR POTENTIAL ACQUISITION OF A SURFACE AND MANUFACTURING METHOD THEREOF

(71) Applicant: Stichting IMEC Nederland, AE Eindhoven (NL)

(72) Inventors: Jiawei Xu, Eindhoven (NL); Vojkan Mihajlovic, Eindhoven (NL)

(73) Assignee: Stichting IMEC Nederland, AE Eindhoven (NL)

( * ) Notice: Subject to any disclaimer, the term of this patent is extended or adjusted under 35 U.S.C. 154(b) by 511 days.

(21) Appl. No.: 17/317,976

(22) Filed: May 12, 2021

(65) Prior Publication Data
US 2021/0353200 A1 Nov. 18, 2021

(30) Foreign Application Priority Data
May 12, 2020 (EP) ..................... 20174008

(51) Int. Cl.
*A61B 5/291* (2021.01)
*A61B 5/00* (2006.01)

(52) U.S. Cl.
CPC ............ *A61B 5/291* (2021.01); *A61B 5/0006* (2013.01); *A61B 5/6814* (2013.01)

(58) Field of Classification Search
CPC . A61B 5/291; A61B 5/293; A61B 5/00–0006; A61B 5/6814; A61B 5/30–315; A61B 2018/00839; A61B 5/369–386
USPC .............. 600/546, 545, 544, 547, 509, 521, 600/511–519
See application file for complete search history.

(56) References Cited

U.S. PATENT DOCUMENTS

| | | | |
|---|---|---|---|
| 6,007,532 A * | 12/1999 | Netherly | A61N 1/0492 606/35 |
| 6,247,350 B1 | 6/2001 | Tsukuda et al. | |
| 2005/0215916 A1 | 9/2005 | Fadem et al. | |
| 2009/0082691 A1* | 3/2009 | Denison | A61B 5/374 600/544 |
| 2014/0336473 A1* | 11/2014 | Greco | A61B 5/7225 600/509 |
| 2015/0148619 A1* | 5/2015 | Berg | A61B 5/6804 600/300 |
| 2016/0120432 A1 | 5/2016 | Sridhar et al. | |
| 2017/0172447 A1* | 6/2017 | Mitra | A61B 5/0075 |

(Continued)

OTHER PUBLICATIONS

Versek, et. al., "Electric field encephalography for brain activity monitoring", Jun. 13, 2018, Jornal of Neural Engineering, pp. 1-16, (Year: 2018).*

(Continued)

*Primary Examiner* — Jason M Sims
*Assistant Examiner* — Jennifer Grace Baires-Tweed
(74) *Attorney, Agent, or Firm* — MOSER TABOADA

(57) ABSTRACT

An electrode (10) for potential acquisition of a surface is provided. The electrode (10) comprises at least two pins (11a, 11b, 21) for contacting the surface, and a local signal processing unit (12) connected to at least one (11a, 11b) of the pins (11a, 11b, 21). The local signal processing unit (12) is configured to perform signal processing operations with respect to the corresponding surface potential signal of the (Continued)

respective at least one pin (11*a*, 11*b*). In addition to this, the local signal processing unit (12) is directly integrated into the electrode (10).

14 Claims, 8 Drawing Sheets

(56) References Cited

U.S. PATENT DOCUMENTS

2018/0078164 A1  3/2018  Menon et al.
2020/0163563 A1*  5/2020  Meyer ............... A61B 5/318

OTHER PUBLICATIONS

Harrison et al: "Design and Testing of an Integrated Circuit for Multi-Electrode Neural Recording", 20th International Conference on VLSI Design held jointly with 6th International Conference on Embedded Systems, pp. 907-912, 2007.
Matthews et al: "Real Time Workload Classification from an Ambulatory Wireless EEG System Using Hybrid EEG Electrodes", 30th Annual International IEEE Engineering in Medicine an Biology Society, Vancouver, British Columbia, Canada, pp. 5871-5875, Aug. 2008.
Sellers et al: "A Novel Dry Electrode for Brain-Computer Interface", 13th International Conference, Human-Computer Interaction International 2009, San Diego, CA, USA, Proceedings, Part II, pp. 1-10, Jul. 2009.
Mora Lopez et al: "An Implantable 455-Active-Electrode 52-Channel CMOS Neural Probe", IEEE Journal of Solid-State Circuits, vol. 49, No. 1, pp. 248-261, Jan. 2014.
Xu et al: "A Wearable 8-Channel Active-Electrode EEG/ETI Acquisition System for Body Area Networks", IEEE Journal of Solid-State Circuits, vol. 49, No. 9, pp. 2005-2016, Sep. 2014.
Raducanu et al: "Time multiplexed active neural probe with 678 parallel recording sites", 46th European Solid-State Device Research Conference, pp. 385-388, Sep. 2016.
Versek et al: "Electric field encephalography for brain activity monitoring", Journal of Neural Engineering, Institute of Physics Publishing, Bristol, Great Britain, vol. 15, 046027, pp. 1-16, Jun. 13, 2018.
Extended European Search Report in EP20174008.1 dated Nov. 11, 2020.

* cited by examiner

ELECTRODE FOR POTENTIAL ACQUISITION OF A SURFACE AND MANUFACTURING METHOD THEREOF

CROSS REFERENCE TO RELATED APPLICATION

This application claims priority to EPC Application No. 20174008.1, filed on May 12, 2020, which is incorporated herein by reference in its entirety.

The invention relates to an electrode for potential acquisition of a surface and a method for manufacturing an electrode for potential acquisition of a surface.

Generally, in times of an increasing number of medical applications allowing for recording an electroencephalography (EEG), there is a growing need of an electrode for potential acquisition of a surface and a method for manufacturing an electrode for potential acquisition of a surface, which ensure a particularly high accuracy and efficiency.

US 2016/0120432 A1 relates to a sensor system and process for measuring electromagnetic activity of a brain. The system and process employ a sensor assembly having a plurality of electrodes arranged in a closely spaced arrangement and a processor to determine a weighted average of the signals indicative of an electric field generated by electromagnetic activity of the brain. The system provides a medical body area network of a subject including one or more of the sensor assemblies and one or more additional sensors, which may be within a smartphone or other wearable device. Disadvantageously, in accordance with said weighted average, a particularly high accuracy cannot be ensured.

Accordingly, there is an object to provide an electrode for potential acquisition of a surface and a method for manufacturing an electrode for potential acquisition of a surface, thereby ensuring a particularly high accuracy and efficiency with special respect to the potential acquisition.

This object is solved by the features of the first independent claim for an electrode for potential acquisition of a surface and the features of the second independent claim for a method for manufacturing an electrode for potential acquisition of a surface. The dependent claims contain further developments.

According to a first aspect of the invention, an electrode for potential acquisition of a surface is provided. The electrode comprises at least two pins for contacting the surface, and a local signal processing unit connected to at least one of the pins. In this context, the local signal processing unit is configured to perform signal processing operations with respect to the corresponding surface potential signal of the respective at least one pin. In addition to this, the local signal processing unit is directly integrated into the electrode. Advantageously, the potential acquisition of the surface can be done in a particularly high accurate and efficient manner.

According to a first preferred implementation form of the first aspect of the invention, the local signal processing unit comprises at least one amplifier. In this context, the at least one amplifier is configured to amplify the corresponding surface potential signal of the respective at least one pin. Advantageously, for instance, accuracy can further be increased.

According to a second preferred implementation form of the first aspect of the invention, the local signal processing unit comprises at least one analog-to-digital converter. In this context, the at least one analog-to-digital converter is configured to digitize the corresponding surface potential signal of the respective at least one pin or, especially in the case that the local signal processing unit comprises at least one amplifier, said signal after amplification. Advantageously, for example, efficiency can further be increased.

According to a further preferred implementation form of the first aspect of the invention, the local signal processing unit comprises a digital signal processor. In this context, the digital signal processor is configured to perform at least a part of the signal processing operations. Advantageously, for instance, flexibility can further be increased, thereby increasing efficiency.

According to a further preferred implementation form of the first aspect of the invention, the local signal processing unit comprises an analog signal processor. In this context, the analog signal processor is configured to perform at least a part of the signal processing operations.

Advantageously, for example, accuracy can further be increased.

According to a further preferred implementation form of the first aspect of the invention, the local signal processing unit comprises at least one impedance measurement unit. In this context, the at least one impedance measurement unit is configured to evaluate the corresponding contact quality between the surface and the electrode on the basis of the corresponding surface potential signal of the respective at least one pin. In the case that the local signal processing unit comprises at least one amplifier, said signal is considered after amplification. Advantageously, for instance, not only accuracy but also efficiency can be increased.

According to a further preferred implementation form of the first aspect of the invention, the at least one impedance measurement unit is configured to indicate the corresponding impedance range of the respective electrode-surface contact impedance especially in the form of at least one digital output. In this context, especially in the case that the local signal processing unit comprises a digital signal processor, said at least one digital output is preferably provided for the digital signal processor. Advantageously, for example, complexity can be reduced, which leads to an increased efficiency.

According to a further preferred implementation form of the first aspect of the invention, the local signal processing unit comprises a communication unit. In this context, the communication unit is configured to transmit the corresponding results of the signal processing operations to a back-end unit. Advantageously, for instance, efficiency can further be increased.

According to a further preferred implementation form of the first aspect of the invention, the communication unit is configured to receive configuration data for configuring the local signal processing unit especially from the back-end unit. Advantageously, for example, the local signal processing unit can be configured in a particularly flexible and efficient manner.

According to a further preferred implementation form of the first aspect of the invention, the respective communication with the aid of the communication unit is based on a wireline communication, preferably employing at least one of serial peripheral interface, inter-integrated circuit, or universal asynchronous receiver transmitter. In addition to this or as an alternative, the respective communication with the aid of the communication unit is based on a wireless communication, preferably employing at least one of BLUETOOTH®, especially BLUETOOTH® low energy, wireless local area network, or ZIGBEE®. Advantageously, for instance, flexibility can further be increased, thereby also increasing efficiency.

According to a further preferred implementation form of the first aspect of the invention, at least one pin, being not connected to the local signal processing unit, is a passive pin, preferably a reference pin. Preferably, with respect to the corresponding surface potential signal the signal processing operations are not performed by the local signal processing unit. In addition to this or as an alternative, the at least one pin being connected to the local signal processing unit is an active pin, preferably a signal pin. Advantageously, for example, at least one reference can be provided in an accurate and efficient manner.

According to a further preferred implementation form of the first aspect of the invention, each of the at least two pins is connected to the local signal processing unit. In addition to this or as an alternative, a corresponding reference input of the at least one amplifier is common for the at least two pins. Further additionally or further alternatively, the local signal processing unit is configured to reconfigure the passive pin, especially the at least one passive pin, and the at least one active pin if a reference reconfiguration is required. Advantageously, for instance, efficiency can further be increased by increasing flexibility.

According to a further preferred implementation form of the first aspect of the invention, before each surface potential acquisition, the local signal processing unit is configured to perform at least one impedance measurement with the aid of the at least one impedance measurement unit on the at least one pin being connected to the local signal processing unit, preferably on each of the at least two pins. Advantageously, for example, accuracy can further be increased.

According to a further preferred implementation form of the first aspect of the invention, the surface is a skin, preferably human or animal skin. In addition to this or as an alternative, the electrode is used for recording an electroencephalography. Advantageously, for instance, both accuracy and efficiency can further be increased.

According to a second aspect of the invention, a method for manufacturing an electrode for potential acquisition of a surface is provided. The method comprises the steps of co-integrating at least two pins for contacting the surface and a local signal processing unit into the electrode, connecting the local signal processing unit to at least one of the pins, and configuring the local signal processing unit to perform signal processing operations with respect to the corresponding surface potential signal of the respective at least one pin. Advantageously, an electrode for potential acquisition of a surface can be manufactured in a particularly accurate and efficient manner.

Exemplary embodiments of the invention are now further explained with respect to the drawings by way of example only, and not for limitation. In the drawings.

Figure 1:
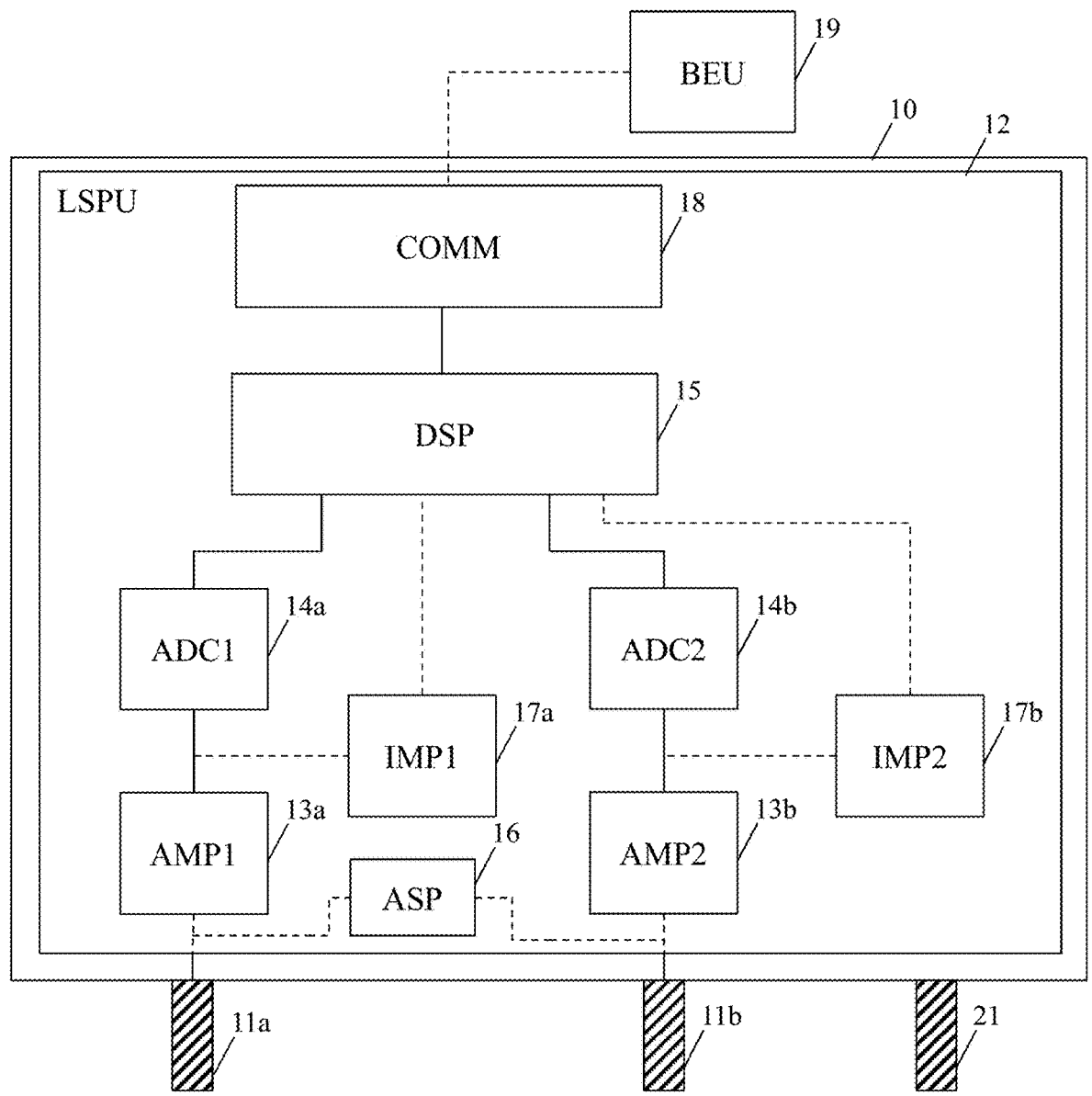
FIG. 1 shows a first exemplary embodiment of an inventive electrode for transcranial current stimulation.

With respect to FIG. 1, a block diagram of an exemplary embodiment of an electrode 10 for potential acquisition of a surface is shown.

As it can be seen, the electrode 10 comprises at least two pins, exemplarily three pins 11*a*, 11*b*, 21, for contacting the surface, and a local signal processing unit 12 connected to at least one, exemplarily two 11*a*, 11*b*, of the pins. In this context, the local signal processing unit 12 is configured to perform signal processing operations with respect to the corresponding surface potential signal of the respective at least one pin, exemplarily of the respective two pins 11*a*, 11*b*. In addition to this, the local signal processing unit 12 is directly integrated into the electrode 10.

Furthermore, the local signal processing unit 12 comprises at least one amplifier, exemplarily two amplifiers 13*a*, 13*b*, preferably one amplifier per pin, especially per active pin. In this context, the at least one amplifier, exemplarily each of the two amplifiers 13*a*, 13*b*, is configured to amplify the corresponding surface potential signal of the respective at least one pin, exemplarily the respective two pins 11*a*, 11*b*.

Moreover, the local signal processing unit 12 comprises at least one analog-to-digital converter, exemplarily two analog-to-digital converters 14*a*, 14*b*, preferably one analog-to-digital converter per pin, especially per active pin. In this context, the at least one analog-to-digital converter, exemplarily each of the two analog-to-digital converters 14*a*, 14*b*, is configured to digitize the corresponding surface potential signal of the respective one of the two pins 11*a*, 11*b*, exemplarily said signal after amplification.

As it can further be seen from FIG. 1, the local signal processing unit 12 comprises a digital signal processor 15. In this context, the digital signal processor 15 is configured to perform at least a part of the signal processing operations.

In addition to this, the local signal processing unit 12 comprises an analog signal processor 16, wherein the analog signal processor 16 is configured to perform at least a part of the signal processing operations. Preferably, said analog signal processor 16 is connected to the at least one pin, exemplarily to the two pins 11*a*, 11*b*. Additionally or alternatively, the analog signal processor 16 may be connected to an output of the at least one amplifier, exemplarily an output of the two amplifiers 13*a*, 13*b*.

Furthermore, the local signal processing unit 12 comprises at least one impedance measurement unit, exemplarily two impedance measurement units 17*a*, 17*b*. In this context, the at least one impedance measurement unit, exemplarily each of the two impedance measurement units 17*a*, 17*b*, is configured to evaluate the corresponding contact quality between the surface and the electrode 10 on the basis of the corresponding surface potential signal of the respective at least one pin, exemplarily of the respective one of the two pins 11*a*, 11*b* or said signal after amplification, respectively.

It is noted that it might be particularly advantageous if the at least one impedance measurement unit, exemplarily each of the two impedance measurement units 17*a*, 17*b*, is configured to indicate the corresponding impedance range of the respective electrode-surface contact impedance especially in the form of at least one digital output. Exemplarily, said at least one digital output is provided for the digital signal processor 15.

Moreover, the local signal processing unit 12 of the electrode 10 comprises a communication unit 18, wherein the communication unit 18 is configured to transmit the corresponding results of the signal processing operations to a back-end unit 19. In this context, it might be particularly advantageous if the communication unit 18 is configured to receive configuration data for configuring the local signal processing unit 12 especially from the back-end unit 19.

It is further noted that the respective communication with the aid of the communication unit 18 may especially be based on a wireline communication, preferably employing at least one of serial peripheral interface (SPI), inter-integrated circuit (I2C), or universal asynchronous receiver transmitter (UART). In addition to this or as an alternative, the respective communication with the aid of the communication unit 18 may especially be based on a wireless communication, preferably employing at least one of BLUETOOTH®, especially BLUETOOTH® low energy (BLE), wireless local area network (WLAN), or ZIGBEE®.

With respect to the above-mentioned active pin, it is noted that a pin, exemplarily pin 21, being not connected to the local signal processing unit 12 or a pin, exemplarily said pin 21, is a passive pin, preferably a reference pin. With respect to the corresponding surface potential signal the signal processing operations are not performed by the local signal processing unit 12.

Accordingly, in this exemplary embodiment according to FIG. 1, each of the pins 11a, 11b being connected to the local signal processing unit 12 is an active pin, preferably a signal pin. It is further noted that it might be particularly advantageous if a corresponding reference input of the two amplifiers 13a, 13b is common for the two pins 11a, 11b.

In addition to this or as an alternative, the local signal processing unit 12 may preferably be configured to reconfigure the passive pin, exemplarily the passive pin 21, and the exemplarily two active pins 11a, 11b, if a reference reconfiguration is required. Preferably, in this context, the passive pin 21 may be connected to the local signal processing unit 12.

Advantageously, before each surface potential acquisition, the local signal processing unit 12 may preferably be configured to perform at least one impedance measurement with the aid of the at least one impedance measurement unit, exemplarily with the aid of each of the two impedance measurement units 17a, 17b, on the at least one pin, exemplarily on each of the two pins 11a, 11b, being connected to the local signal processing unit 12.

With respect to the surface, it is noted that the surface may be skin, preferably human or animal skin.

In addition to this or as an alternative, the electrode 10 may preferably be used for recording an electroencephalography (EEG).

Figure 2:
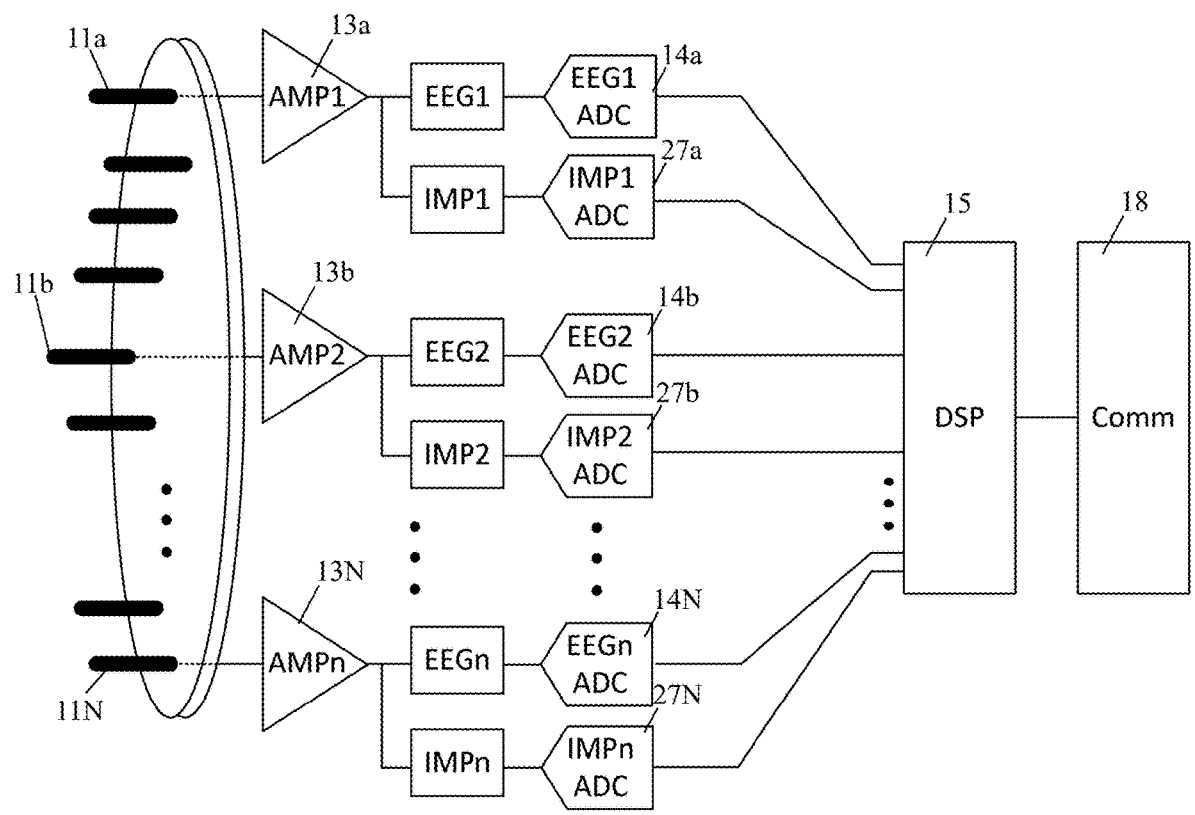
FIG. 2 shows a second exemplary embodiment of an inventive electrode.
Figure 3:
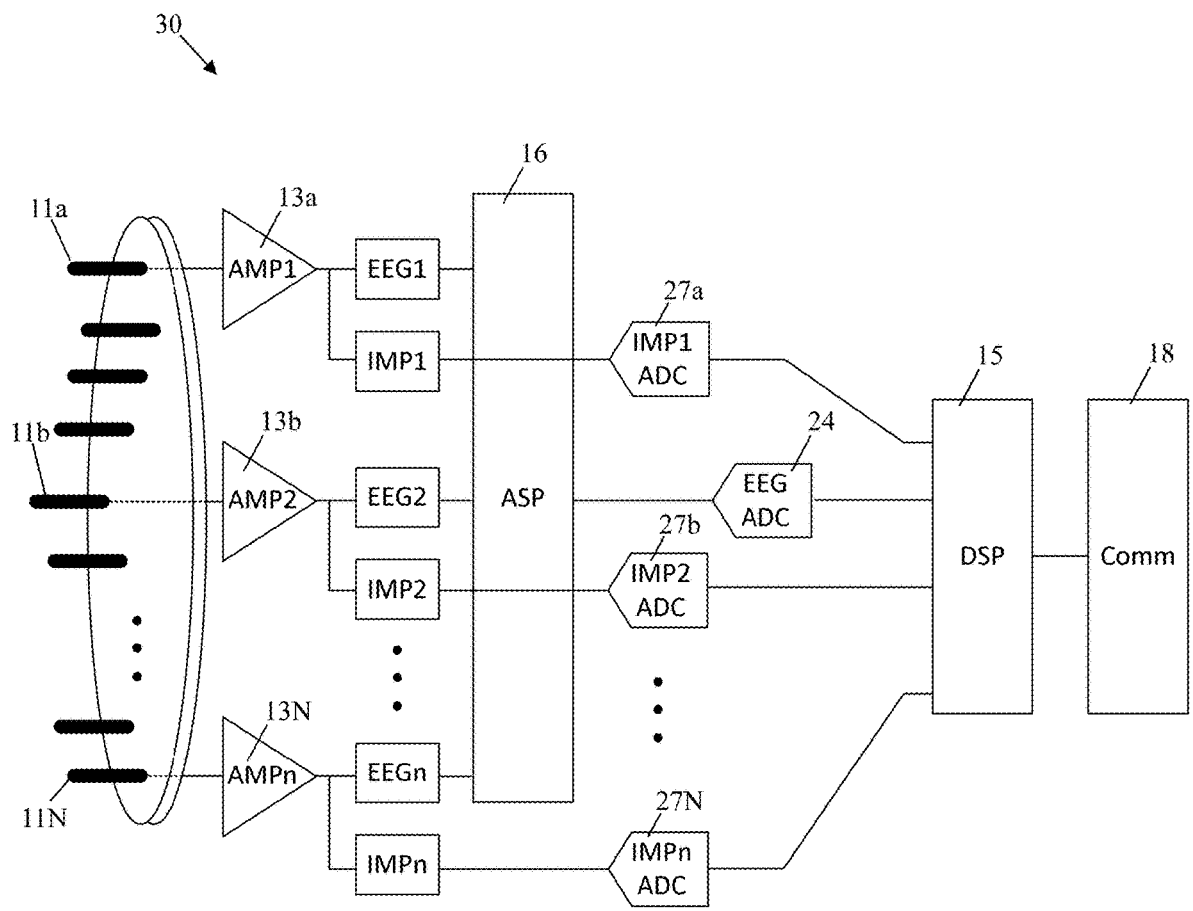
FIG. 3 shows a third exemplary embodiment of an inventive electrode.

With respect to the second embodiment according to FIG. 2 and the third embodiment according to FIG. 3, said capability of EEG recording is illustrated by a respective EEG-path EEG1, EEG2, . . . , EEGn for the corresponding pin 11a, 11b, . . . , 11N especially in addition to the respective contact impedance estimating or analyzing path IMP1, IMP2, . . . , IMPn for the corresponding pin 11a, 11b, . . . , 11N. Preferably, for each of the pins 11a, 11b, . . . , 11N, especially active pins, said different paths for recording an EEG and estimating or analyzing the respective contact impedance are parallel paths.

In this context, it is additionally noted that for each of the pins 11a, 11b, . . . , 11N, especially active pins, an additional analog-to-digital converter 27a, 27b, . . . , 27N is provided, especially for digitizing the corresponding impedance measurement signal. Accordingly, it might be particularly advantageous if the local signal processing unit 12 of the first embodiment comprises two analog-to-digital converters preferably for each of the pins, especially for each of the active pins. Preferably, said additional analog-to-digital converters 27a, 27b, . . . , 27N may be a part of an respective impedance measurement unit such as the above-mentioned impedance measurement units 17a, 17b of the first embodiment 10.

Now, with respect to FIG. 2, it is noted that each of the EEG-paths EEG1, EEG2, . . . , EEGn and each of the impedance measurement paths IMP1, IMP2, . . . , IMPn comprise respective analog-to-digital converters 14a, 14b, . . . , 14N, 27a, 27b, . . . , 27N. Accordingly, an analog signal processor such as the analog signal processor 16 of the first embodiment 10 is not required.

By contrast thereto, with respect to the third embodiment of an inventive electrode 30 according to FIG. 3, each of the impedance measurement paths IMP1, IMP2, . . . , IMPn comprises a respective analog-to-digital converter 27a, 27b, . . . , 27N, whereas each of the EEG-paths EEG1, EEG2, . . . , EEGn is connected to the analog signal processor 16. In this context, an output, especially an analog output, of the analog signal processor 16, is digitized by an analog-to-digital converter, especially by a centralized analog-to-digital converter 24. An output of said analog-to-digital converter 24 is connected to the digital signal processor 15, whereas corresponding outputs of the respective analog-to-digital converter 27a, 27b, . . . , 27N of the impedance measurement paths IMP1, IMP2, . . . , IMPn are also connected to said digital signal processor 15.

Figure 4:
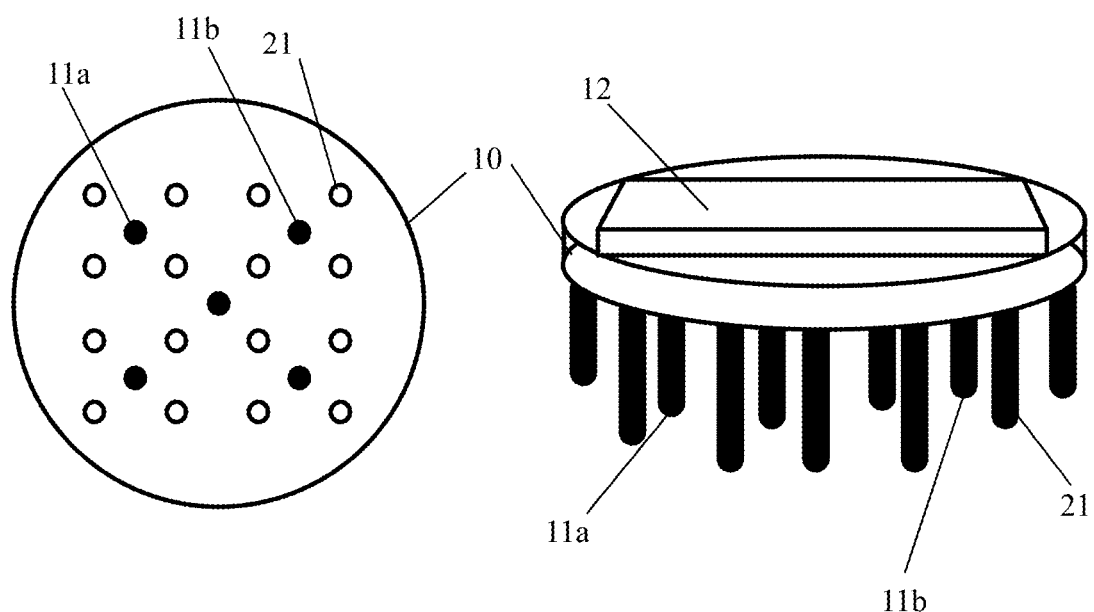
FIG. 4 shows an exemplary plan view (left) and an exemplary three-dimensional view (right) of an inventive electrode.

Now, with respect to FIG. 4, an exemplary plan view (left) and an exemplary three-dimensional view (right) of an inventive electrode, especially a dry electrode, in accordance with the first embodiment according to FIG. 1, the second embodiment according to FIG. 2, and the third embodiment according to FIG. 3 are shown. As it can be seen, the electrode 10 is a circular electrode comprising a first side and a second side. In this context, the first side comprises the local signal processing unit 12, whereas the second side comprises the pins, especially active pins (black), exemplarily represented by reference signs 11a, 11b, and passive pins (white), exemplarily represented by reference sign 21.

It is further noted that the pins, especially active and passive pins, are distributed over the second side of the electrode according to a certain pattern. Advantageously, at least one pin, preferably at least one of the active pins, more preferably each of the active pins, most preferably each of the pins, may be coated with silver and/or silver chloride. Further advantageously, again with respect to EEG and impedance measurement as already mentioned above, it is noted that EEG signals and impedance signals, especially electrode-tissue impedance (ETI) signals, can be measured simultaneously with a common amplifier, preferably a common amplifier per pin, especially per active pin such as the amplifiers 13a, 13b, . . . , 13N.

Preferably, the bandwidth of each of the EEG signals is lower than 150 hertz, whereas the bandwidth of each of the ETI signals is higher than 1 kilohertz. Accordingly, especially due to the fact that EEG signals and ETI signals are located at different bandwidths, both signals can be amplified simultaneously. Afterwards, said signals can separately be demodulated in order to separate these signals especially with the aid of low-pass filters.

Figure 5:
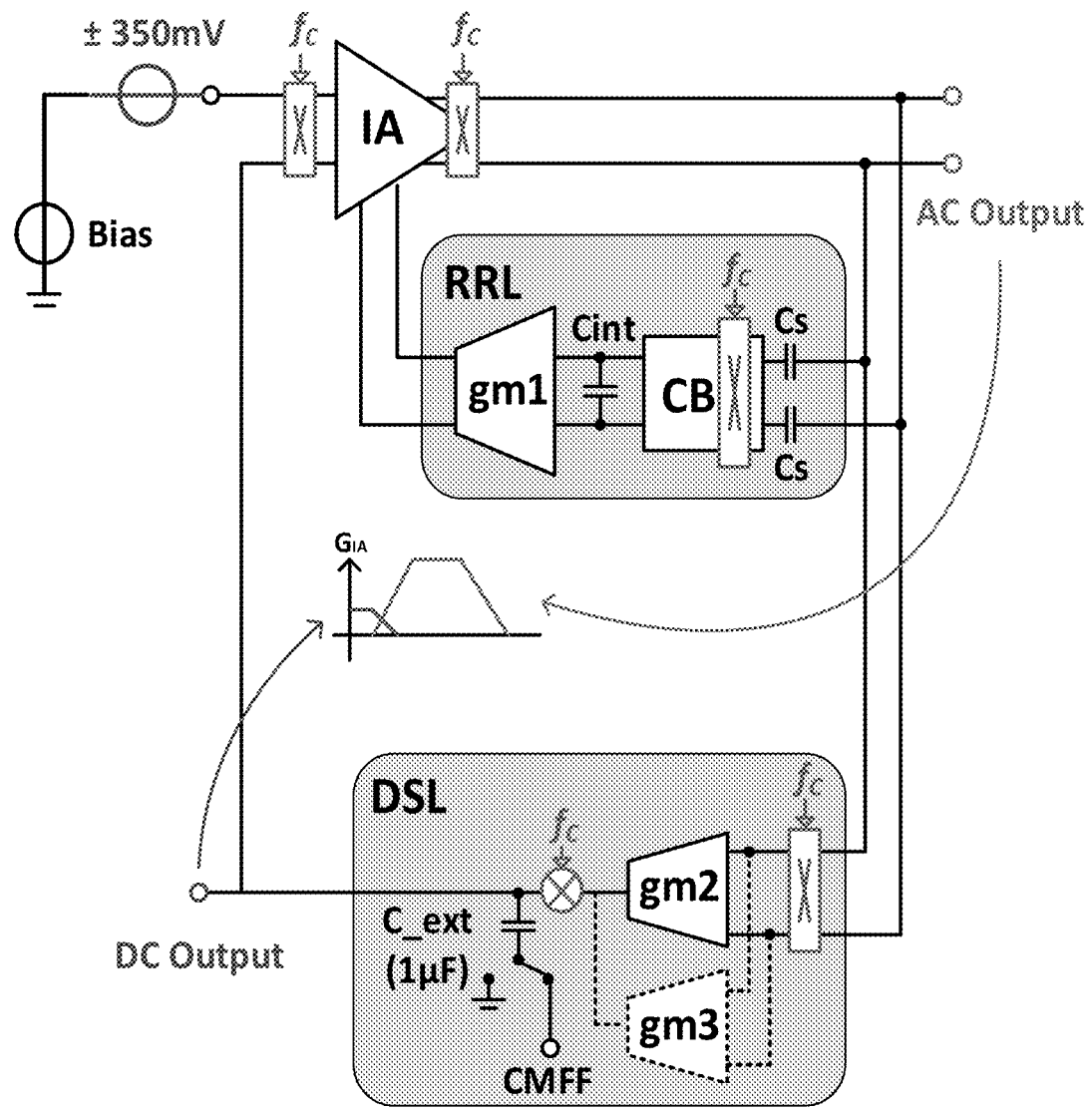
FIG. 5 shows an exemplary embodiment of an amplifier for an inventive electrode.

Now, within the scope of amplification, an exemplary embodiment of an amplifier for an inventive electrode is illustrated by FIG. 5. More specifically, FIG. 5 shows an example of single-end input instrumentation amplifier (IA), where the other reference terminal of the amplifier is connected to a DC-servo loop (DSL). Hence, the whole amplifier, including the core instrumentation amplifier (IA), the DSL and the ripple reduction loop (RRL), is AC-coupled to tolerate the DC electrode offset.

Figure 6:
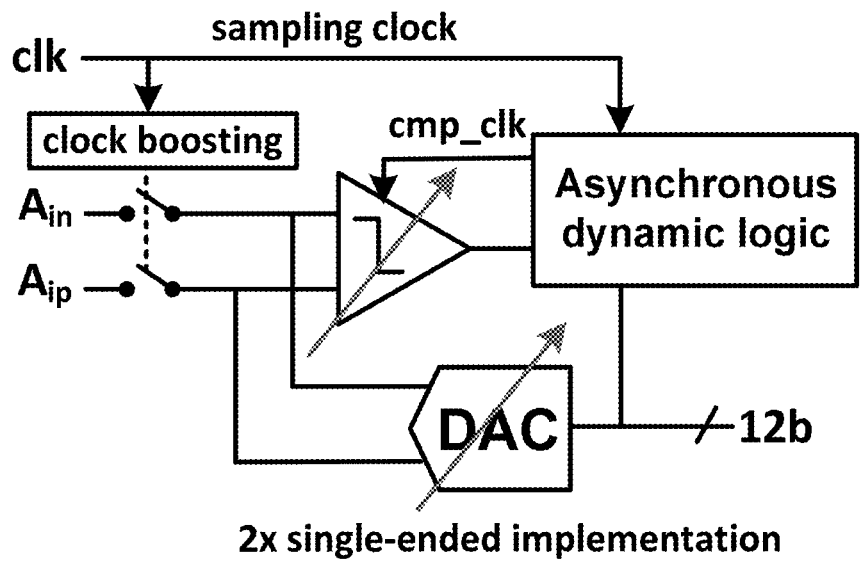
FIG. 6 shows an exemplary embodiment of an analog-to-digital converter for an inventive electrode.

Now, with respect to FIG. 6, an exemplary embodiment of an analog-to-digital converter for an inventive electrode is shown. This analog-to-digital converter is based on a successive approximation register analog-to-digital converter architecture, especially a 12 bit successive approximation register analog-to-digital converter architecture. It can be used as the standalone analog-to-digital converter for each channel such as the above-mentioned analog-to-digital converters 14a, 14b, . . . , 14N or as the common analog-to-digital converter to multiplex the analog outputs of several channels such as the analog-to-digital converter 24.

Figure 7:
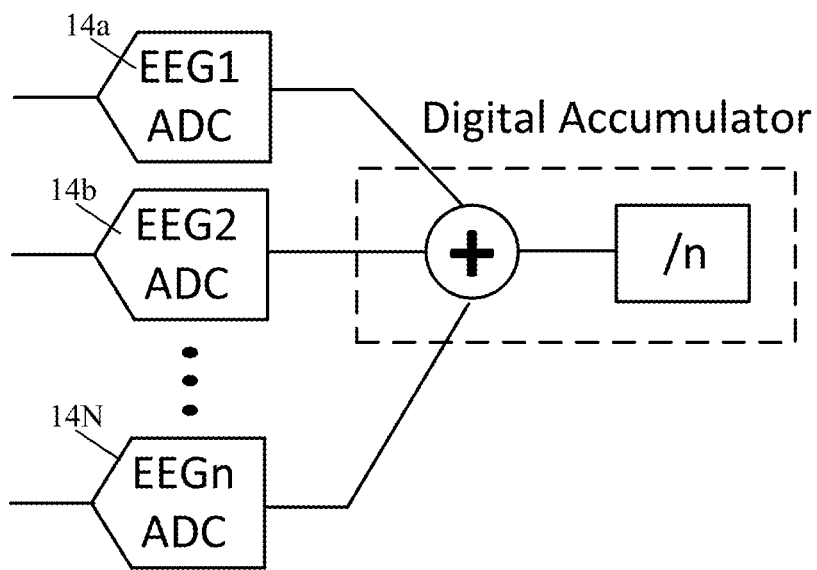
FIG. 7 shows an exemplary embodiment of a digital signal processor for an inventive electrode.

Furthermore, FIG. 7 illustrates an exemplary embodiment of a digital signal processor for an inventive electrode. More specifically, FIG. 7 shows an example of digital signals averaging, wherein multiple digital outputs, exemplarily EEG1 to EEGn of the respective analog-to-digital converters 14a, 14b, . . . , 14N, are added together and then divided by n, especially in the form of a digital accumulator. Preferably, said digital accumulator is used to realize the respective Laplace function.

With respect to said Laplace function or a corresponding surface Laplacian, it is noted that to further compensate for the amplification of noise, said surface Laplacian or re-referencing can be used. In case of surface Laplacian, the signal at each electrode is the difference of the potential at the measurement electrode and scaled (by the distance) potential of surrounding electrodes.

In the case of re-referencing, so called bipolar measurements are derived, such that the EEG is not measured between a measurement electrode and the reference electrode but between two measurement electrodes. This reduces the impact of noise coming from the reference electrode. However, certain component of noise coming from the two different electrodes (at a distant location) remains in the signal.

Figure 8:
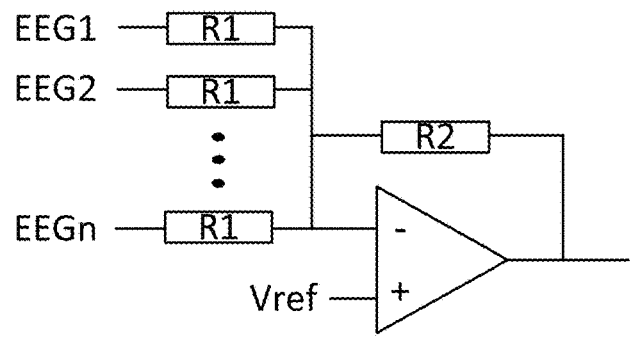
FIG. 8 shows an exemplary embodiment of an analog signal processor for an inventive electrode.

Now, with respect to FIG. 8, an exemplary embodiment of an analog signal processor for an inventive electrode is shown. More specifically, FIG. 8 illustrates an example of analog signals averaging, wherein multiple analog signals, exemplarily EEG1 to EEGn, are effectively averaged by a summing amplifier with a voltage gain of (EEG1+EEG2+ . . . EEGn)*(R2/R1). Preferably, said summing amplifier is used to realize the respective Laplace function.

Figure 9:
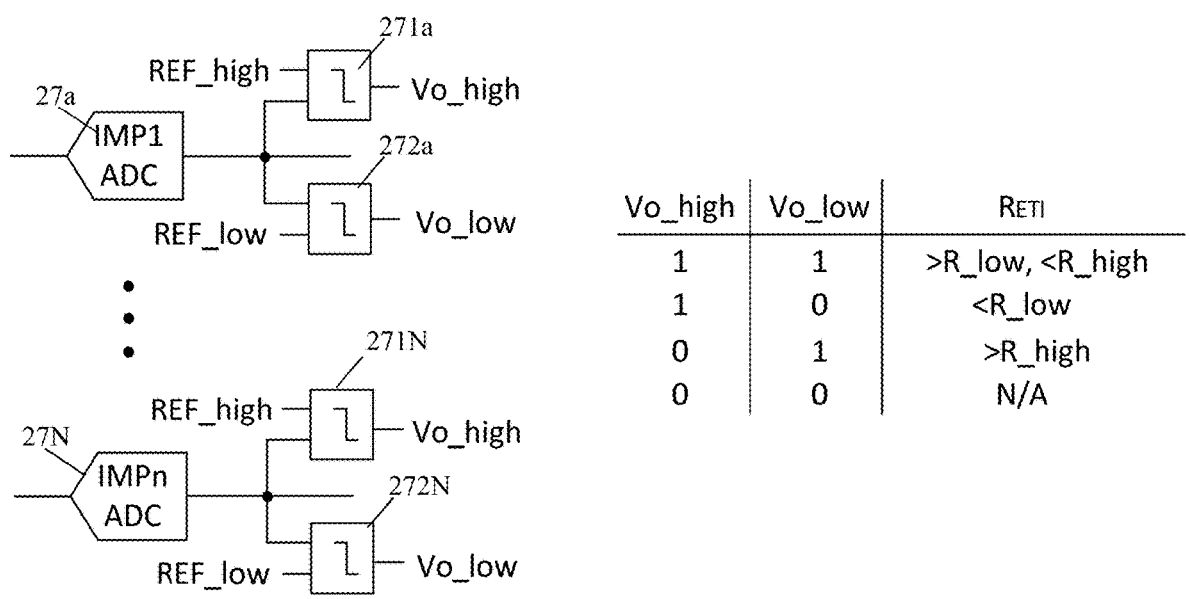
FIG. 9 shows an exemplary contact impedance analyzing circuit for a pin of an inventive electrode.

In accordance with FIG. 9, an exemplary contact impedance analyzing circuit for a pin such as pins 11a, 11b, . . . , 11N of an inventive electrode is shown. As it can be seen from FIG. 9, said analyzing circuit comprises two comparators 271a, . . . , 271N and 272a, . . . , 272N for each pin 11a, 11b, . . . , 11N, both especially connected to an output of the respective analog-to-digital converter 27a, . . . , 27N.

It is noted that one 271a, . . . , 271N of each two comparators is configured to compare the respective digitized signal with an upper reference voltage, whereas the other one 272a, . . . , 272N of said two comparators per pin 11a, . . . , 11N is configured to compare said respective digitized signal to a lower reference voltage. The corresponding decision table is also illustrated with the aid of FIG. 9. In other words, FIG. 9 shows an example of using the respective impedance output, exemplarily IMP1, . . . , IMPn, to determine the corresponding ETI range or an example of digitization of electrode-tissue impedance signals, respectively.

In this context, the analog output of ETI (either ETI-I or ETI-Q) can be compared with two (as depicted in FIG. 9) or multiple reference voltages. So the impedance range of ETI can be determined and the resolution of impedance range depends on the total numbers of reference voltage levels. In case the impedance is beyond the threshold (for instance, RETI>R_high indicating very bad contact condition), the output of the respective EEG channel will preferably be abandoned.

Figure 10:
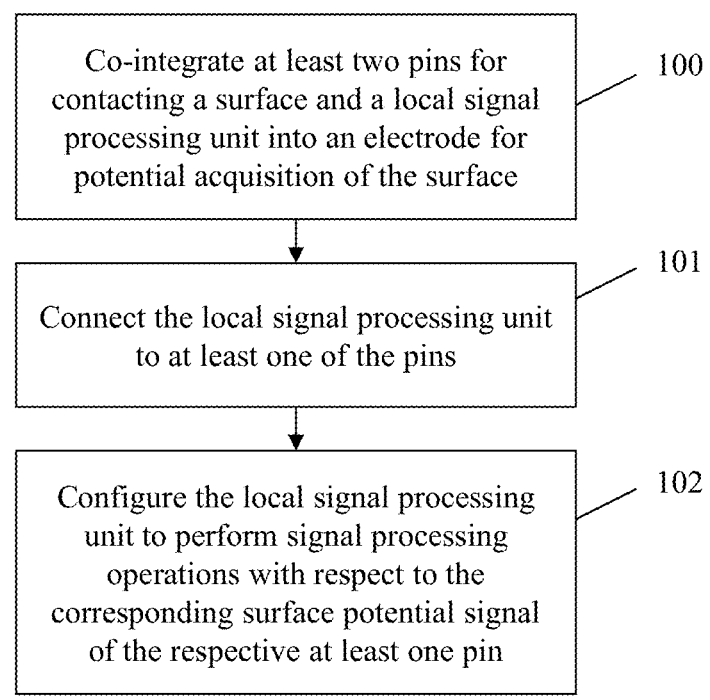
FIG. 10 shows a flow chart of an embodiment of the second aspect of the invention.

Finally, FIG. 10 shows a flow chart of an embodiment of the inventive method for manufacturing an electrode for potential acquisition of a surface. In a first step 100, at least two pins for contacting the surface and a local signal processing unit are co-integrated into the electrode. Then, in a second step 101, the local signal processing unit is connected to at least one of the pins. Furthermore, in a third step 102, the local signal processing unit is configured to perform signal processing operations with respect to the corresponding surface potential signal of the respective at least one pin.

In this context, a pin contact surface of 1 square millimeter has preferably been assumed. It is noted that the respective contact surface of each of the pins 11a, . . . , 11N of the above-mentioned embodiments is preferably between 0.75 and 1.25 square millimeter, more preferably between 0.9 and 1.1 square millimeters.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. An electrode for potential acquisition of a surface, the electrode comprising:
   at least one passive pin;
   at least one active pin; and
   a local signal processing unit connected to at least one of the active pin or the passive pin, wherein the local signal processing unit comprises at least one single-end input instrumentation amplifier, wherein a reference terminal of the at least one single-end input instrumentation amplifier is connected to a DC-servo loop,
   wherein the local signal processing unit is configured to perform signal processing operations with respect to a corresponding surface potential signal of the at least one active pin, wherein with respect to a corresponding surface potential signal of the at least one passive pin, the signal processing operations are not performed by the local signal processing unit, and wherein the at least one single-end instrumentation amplifier is configured to amplify the corresponding surface potential signal of the at least one active pin.

2. The electrode according to claim 1,
wherein the local signal processing unit comprises at least one analog-to-digital converter,
wherein the at least one analog-to-digital converter is configured to digitize the corresponding surface potential signal of the at least one active pin.

3. The electrode according to claim 1,
wherein the local signal processing unit comprises a digital signal processor, and
wherein the digital signal processor is configured to perform at least a part of the signal processing operations.

4. The electrode according to claim 1,
wherein the local signal processing unit comprises an analog signal processor, and
wherein the analog signal processor is configured to perform at least a part of the signal processing operations.

5. The electrode according to claim 1,
wherein the local signal processing unit comprises a communication unit and
wherein the communication unit is configured to transmit results of the signal processing operations to a back-end unit.

6. The electrode according to claim 5,
wherein the communication unit is configured to receive configuration data for configuring the local signal processing unit from the back-end unit.

7. The electrode according to claim 5,
wherein at least one of a communication with the aid of the communication unit is based on a wireline communication or the communication with the aid of the communication unit is based on a wireless communication.

8. The electrode according to claim 1, wherein at least one of:
each of the at least one active pin and each of the at least one passive pin are connected to the local signal processing unit; or a corresponding reference input of the at least one single-end input instrumentation amplifier is common for the at least one active pin and the at least one passive pin; or wherein the local signal processing unit is configured to reconfigure the at least one passive pin and the at least one active pin if a reference reconfiguration is required.

9. The electrode according to claim 1,
wherein the surface is a skin, and/or
wherein the electrode is used for recording an electroencephalography.

10. A method for manufacturing an electrode for potential acquisition of a surface, the method comprising:
co-integrating at least two pins for contacting the surface and a local signal processing unit into the electrode, the two pins including at least one passive pin and at least one active pin, wherein the local signal processing unit comprises at least one single-end input instrumentation amplifier, wherein a reference terminal of the at least one single-end input instrumentation amplifier is connected to a DC-servo loop,
connecting the local signal processing unit to at least one of the active pin or the passive pin, and
configuring the local signal processing unit to perform signal processing operations with respect to a corresponding surface potential signal of at least one active pin, and to not perform the signal processing operations with respect to a corresponding surface potential signal of the at least one passive pin,
wherein the at least one single-end instrumentation amplifier is configured to amplify the corresponding surface potential signal of the at least one active pin.

11. The electrode according to claim 7, wherein the wireless communication employs a low energy wireless network.

12. The electrode according to claim 1, wherein the at least one active pin is a signal pin and the at least one passive pin is a reference pin.

13. The method according to claim 10, wherein the at least one active pin is a signal pin and the at least one passive pin is a reference pin.

14. The electrode according to claim 5, wherein a respective communication with the aid of the communication unit is based on a wireline communication employing at least one of serial peripheral interface, inter-integrated circuit, or universal asynchronous receiver transmitter.

* * * * *